United States Patent
Jones et al.

(10) Patent No.: US 12,498,121 B2
(45) Date of Patent: Dec. 16, 2025

(54) RAPID COOK BROILER WITH MOVABLE HEAT SHIELDS FOR IMPROVED TEMPERATURE CONTROL

(71) Applicant: Nieco, LLC, Windsor, CA (US)

(72) Inventors: Rachel M. Jones, Windsor, CA (US); Michael Janney, Windsor, CA (US)

(73) Assignee: Nieco, LLC, Windsor, CA (US)

( * ) Notice: Subject to any disclaimer, the term of this patent is extended or adjusted under 35 U.S.C. 154(b) by 710 days.

(21) Appl. No.: 18/053,315

(22) Filed: Nov. 7, 2022

(65) Prior Publication Data

US 2023/0160581 A1    May 25, 2023

Related U.S. Application Data

(60) Provisional application No. 63/264,377, filed on Nov. 22, 2021.

(51) Int. Cl.
| | |
|---|---|
| *F24C 15/32* | (2006.01) |
| *A47J 37/06* | (2006.01) |
| *F24C 7/06* | (2006.01) |
| *F24C 7/08* | (2006.01) |
| *F24C 15/28* | (2006.01) |

(52) U.S. Cl.
CPC ......... *F24C 15/325* (2013.01); *A47J 37/0676* (2013.01); *F24C 7/067* (2013.01); *F24C 7/082* (2013.01); *F24C 15/28* (2013.01)

(58) Field of Classification Search
CPC ... A47J 37/0641; A47J 37/0676; F24C 15/22; F24C 15/28; F24C 15/325; F24C 7/046; F24C 7/067; F24C 7/082; F24C 7/085
USPC ......................................................... 219/408
See application file for complete search history.

(56) References Cited

U.S. PATENT DOCUMENTS

| | | | | |
|---|---|---|---|---|
| 4,869,155 | A  * | 9/1989 | Grieve ...................... | F27D 7/04 |
| | | | | 219/400 |
| 2005/0109760 | A1* | 5/2005 | Tatsumu ............... | F24C 15/325 |
| | | | | 219/400 |
| 2009/0065493 | A1* | 3/2009 | Hines, Jr. ................ | F24C 7/087 |
| | | | | 219/400 |
| 2013/0175253 | A1* | 7/2013 | Shei ...................... | A47J 39/003 |
| | | | | 219/400 |
| 2018/0142900 | A1* | 5/2018 | McKee ................ | G06Q 10/087 |
| 2023/0314005 | A1* | 10/2023 | Lai ........................ | F24C 15/322 |
| | | | | 219/398 |

* cited by examiner

*Primary Examiner* — Sang Y Paik
(74) *Attorney, Agent, or Firm* — Andrew F. Young, Esq.; Nolte Lackenbach Siegel

(57) ABSTRACT

A rapid cook finish broiler with programmable, movable heat shields that open at the beginning of a cook cycle and close after a set period of time blocking much of the heat from heating elements from reaching food disposed below, enabling users to keep the heat source at a high setting, and having shelves with adjustable heights and a blower system that provides air flow to distribute and direct hot air onto food product to reduce cooking times.

16 Claims, 5 Drawing Sheets

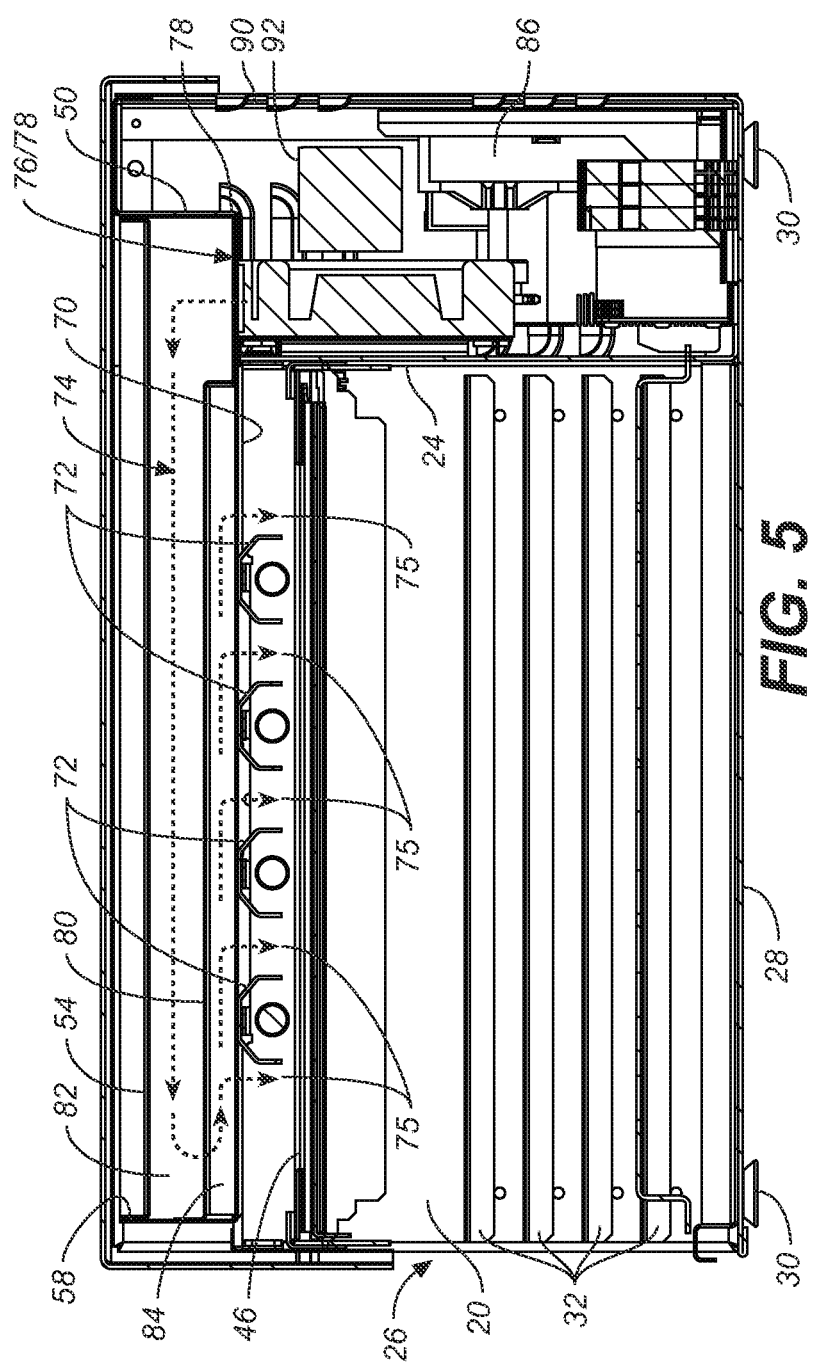

RAPID COOK BROILER WITH MOVABLE HEAT SHIELDS FOR IMPROVED TEMPERATURE CONTROL

CROSS REFERENCES TO RELATED APPLICATIONS

The present application claims the benefit of the filing date of U.S. Provisional Patent Application Ser. No. 63/264,377, filed Nov. 22, 2021 (Nov. 22, 2021), which application is incorporated in its entirety by reference herein.

BACKGROUND OF THE INVENTION

Field of the Invention: The invention relates most generally to a food finishing broiler that rapidly heats all or a portion of a food product, and more particularly to a programmable open-front salamander broiler that includes a blower system to distribute and direct air onto cooking food product and movable heat shields that selectively open and close to commence a heating cycle and rapidly terminate when food has been exposed a predetermined amount of time.

Background Discussion: Food finishing broilers, often called salamander broilers, are used in commercial and restaurant kitchens for a finishing step in preparing food. Such finishing steps might include such things as melting cheese on a dish, toasting a marshmallow, or putting a slight toast or char on a food surface. Food cooking in salamanders generally must be closely monitored to prevent burning.

Salamanders often have open fronts, both to facilitate easy viewing of the cooking food product and for ease in inserting and removing plates. In consequence, they are frequently turned to a high heat setting and left on that high setting the duration of daily restaurant operations. In some establishments, the salamander may be turned to a high setting when food is placed under the heating elements and turned down as soon as the food is finished. In either scenario, because the food is finished so rapidly, operator error is common, and overcooked or burned food is the consequence. It will be appreciated, then, that the vigilance required to prevent burning also prevents the operator from attending to other pressing tasks.

BRIEF SUMMARY OF THE INVENTION

The present invention resolves shortcomings in the prior art by providing a salamander broiler with programmable, movable heat shields that open at the beginning of a cook cycle and close after a set period of time blocking much of the heat from heating elements from reaching food disposed below. Use of such shields enables users to keep the heat source at a high setting, which reduces the amount of time to finish a food product.

The inventive salamander broiler further includes shelves with adjustable heights and a blower system that provides air flow to distribute and direct hot air onto food product to reduce cooking times. All broiler functions are under user control through a user interface that puts each cooking cycle on a timer.

BRIEF DESCRIPTION OF SEVERAL VIEWS OF THE DRAWINGS

The invention will be better understood and objects other than those set forth above will become apparent when consideration is given to the following detailed description thereof. Such description makes reference to the annexed drawings wherein:

FIG. 5 is a cross-sectional, right side view in elevation taken along section lines 5-5 of FIG. 1, showing the air flow through the plenum and manifold to direct air flow across and then down from the sides of the heating elements.

DETAILED DESCRIPTION OF THE INVENTION

Figure 1:
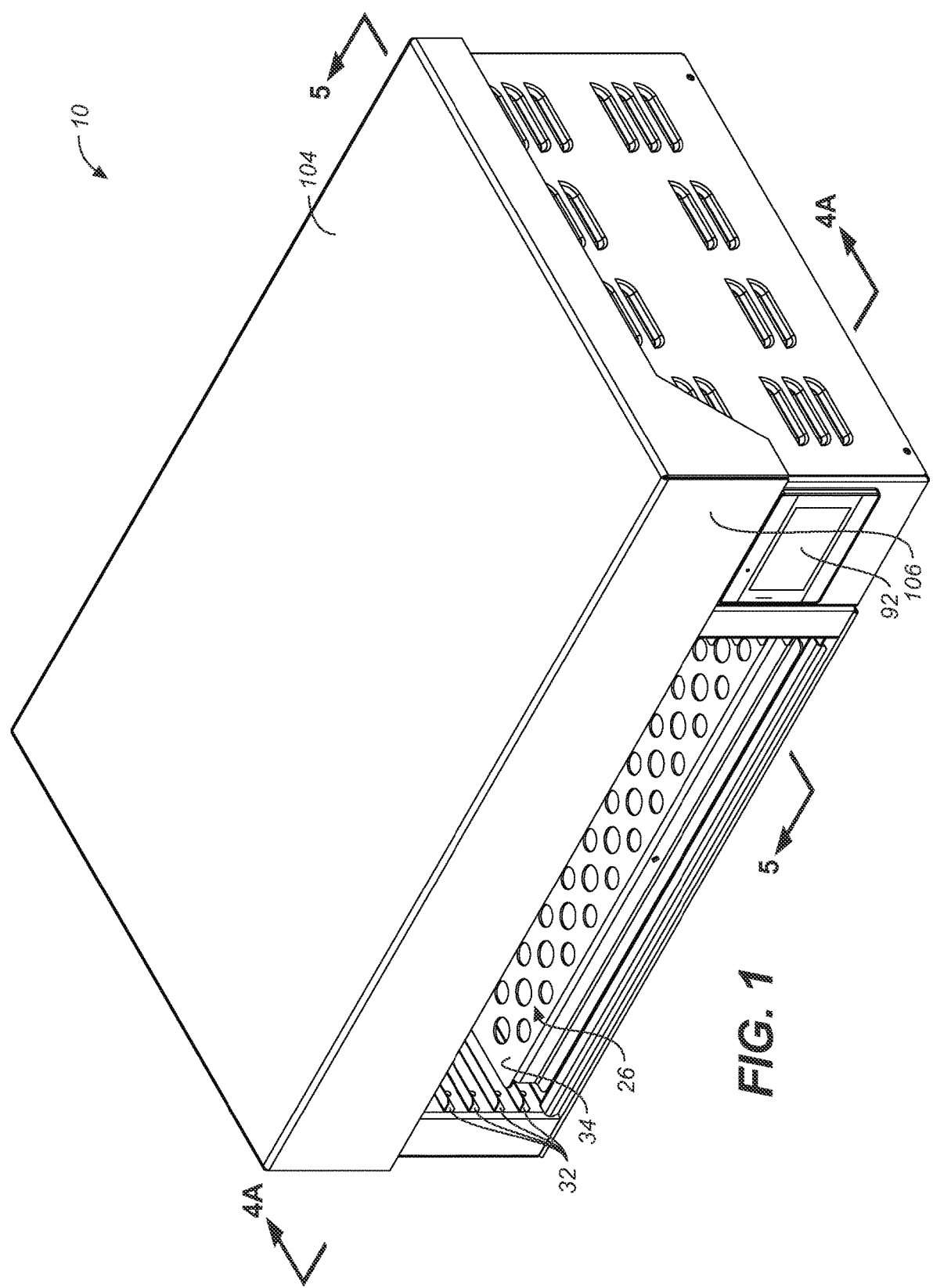
FIG. 1 is an upper front right perspective view of the salamander broiler of the present invention.
Figure 2:
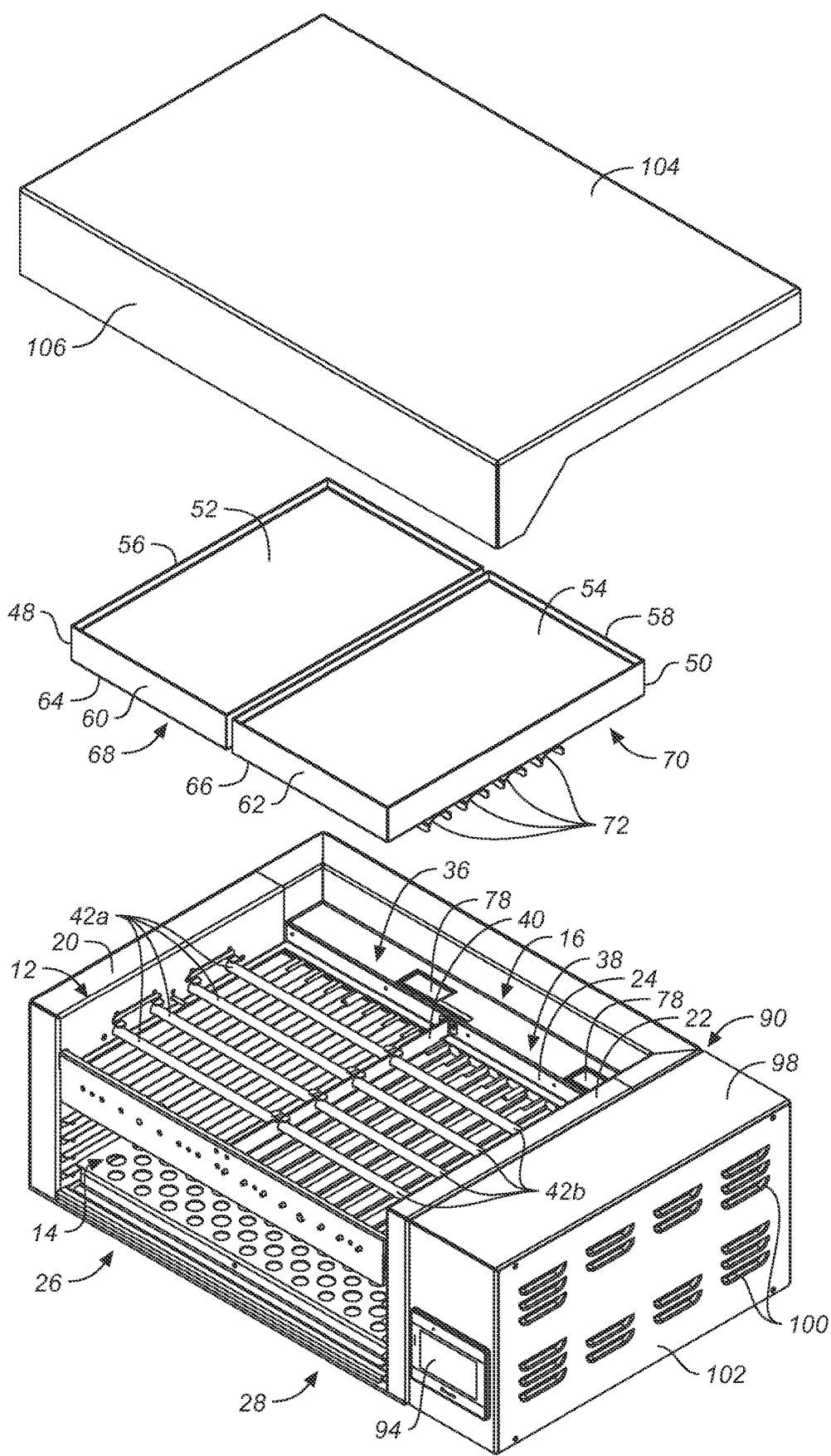
FIG. 2 is a partially exploded view thereof, with the top cover and blower manifold removed to show the heating elements and movable shields.
Figure 3:
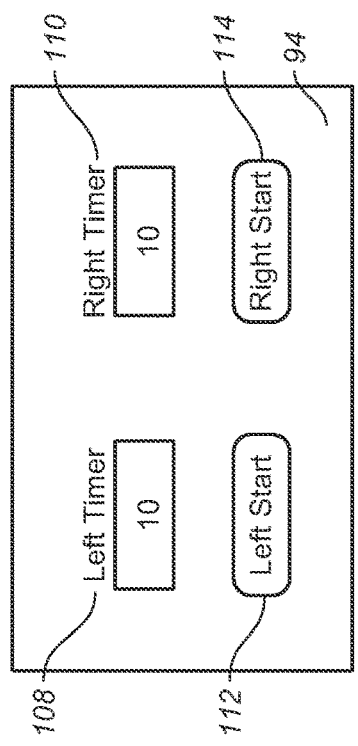
FIG. 3 is a front view in elevation showing the user interface for controlling both the right and left zones of the broiler.
Figure 4A:
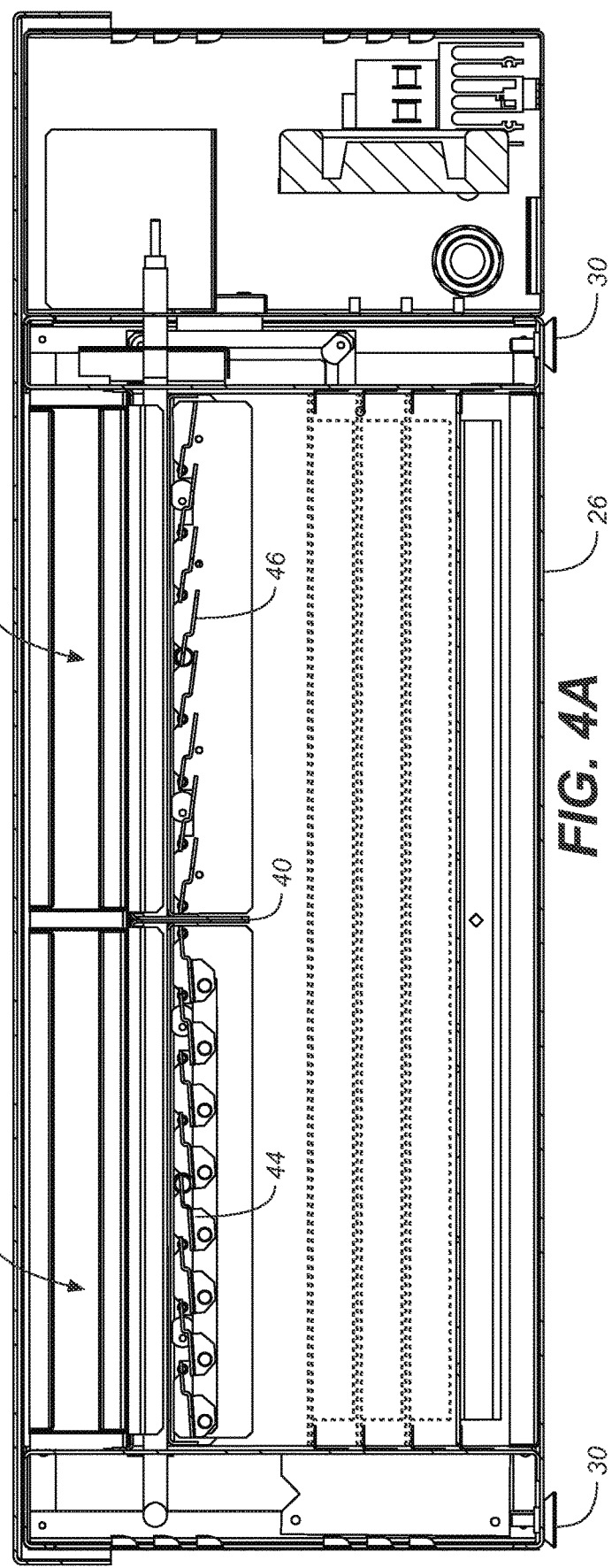
FIG. 4A is a cross-sectional front view in elevation taken along section line 4A-4A of FIG. 1, this view showing heat shields in both cooking zones closed.
Figure 4B:
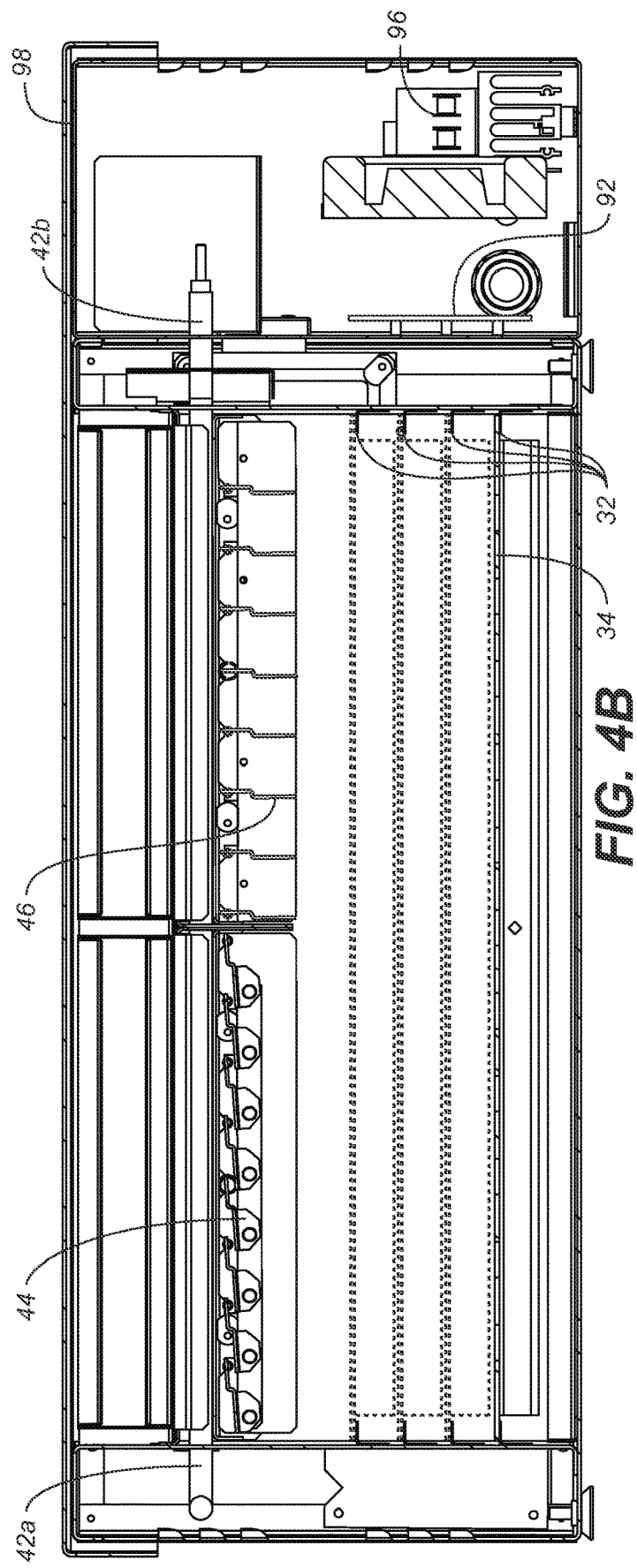
FIG. 4B is the same view showing the right heat shields in an open configuration.

Referring to FIGS. 1 through 5, wherein like reference numerals refer to like components in the various views, there is illustrated therein a new and improved salamander broiler, generally denominated 10 herein. FIG. 1 shows the broiler assembled and configured for use. FIG. 2 is a partially exploded view thereof. These views show that the broiler includes an interior chamber 12 divided into a lower cooking chamber 14 and an upper heating chamber 16. The interior chamber has a left wall 20, a right wall 22, a rear wall 24, an open front 26, and a bottom 28. The broiler is supported by height adjustable legs 30.

Looking into the open front side 26, it is seen that the cooking chamber includes a plurality of shelf supports 32 onto which a movable cooking shelf 34 is selectively placed.

The heating chamber 16 is divided into left and right sides 36, 38 by a partition 40. In each of the left and right sides, a plurality of parallel electric heating elements 42a, 42b, run transversely (from side to side).

Immediately below the heating elements are left and right sets of movable heat shields 44, 46, configured as parallel overlapping slats and linked separately in each of the left and right cooking chambers for unified rotational movement about their longitudinal axis using a push rod or other link. The links are structurally and operatively connected to a motor that rotates one or more of the slats, and thus all slats on a side coupled by the link, or by a motorized linear actuator using a push rod (not shown).

Next, the upper chamber includes left and right air blower manifold assemblies 48, 50. Each are rectangular boxes with a planar top 52, 54, an upper peripheral rim 56, 58, contiguous sides 60, 62, a lower peripheral rim 64, 66, a planar lower side 68, 70, and a plurality of parallel spaced-apart heat reflectors 72 coupled to the lower side. Not fully visible in the views are linear air hole arrays 75 straddling each side of the heat reflectors. Each air blower manifold assembly includes an interior plenum 74 configured with an air inlet 76 coupled to and co-located with an air blower outlet 78. When one or the other or both sides of the heating chamber are in operation, the slats are opened and the air blower is turned on for the working side(s). This moves a volume of air into the plenums and across horizontally disposed baffles 80, which divide the plenums into upper and lower halves 82, 84, in fluid communication with one another, such that air in the lower halves is under pressure. Air in the lower halves exits the air hole arrays under low pressure and is driven downwardly, alongside the heating elements and heat reflectors, to shape and direct the heat pattern over and onto food product on the movable shelf.

The air blower motor 86 and heat shield motors 88 are housed in a motor compartment 90 on the backside of the left and right cooking chambers.

A controller 92 (e.g., an ASIC or microcontroller) having a user interface 94, as well as a power supply 96 for operating the electric heating elements, are housed in a cuboid systems enclosure 98 having air vents 100 on its right side 102. The controller is programmed to control the heating elements, the blower motor, and the heat shield motors. User inputs through the user interface will call the programs to operate according to time inputs by the user. The entire broiler system is capped with a top 104 having a front side 106 that extends down to cover and complete the enclosure of the upper heating chamber 16.

In operation when the unit is turned on, the electrical heating elements produce heat. The heat shields remain closed to prevent most of the heat from passing through to the product chamber until an input is given to the control system by the operator through the user interface. The input provides an option to specify which side of the cooking chamber will be employed (right or left) 108, 110, and how much time will be required for the product finishing. User input that a food product is in the chamber is signified by pressing one of the start buttons 112, 114, indicates to the controller that the shields should open and the elements be exposed so that the directed heat may pass through. Once the shields are fully open, the blower pushes heated air from the air plenum above the elements to speed up the toasting process. The controller has been programmed to turn off the blower and close the heat shields after the selected time has passed.

It will be obvious to those with skill that additional inputs and programming can be provided to control the power provided to the heating elements, the force of the air blown through the manifolds, and the degree of openness or closure of the heat shields, such that finely tailored cooking specifications can be followed to achieve an optimal result. Such features are not considered here, inasmuch as the fundamental novel aspect of the invention resides in the programmable, selectively opened and closed heat shields used in conjunction with directed air to control, enhance, and expedite finish cooking of food product in a rapid cook broiler.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. A rapid cook broiler, comprising:
   an interior chamber defined by a left wall, a right wall, a rear wall, an open front, and a bottom, said interior chamber divided into a lower cooking chamber and an upper heating chamber;
   cooking shelf support structure disposed on said left wall and said right wall of said lower cooking chamber;
   a movable cooking shelf disposed on said cooking shelf support structure;
   a partition dividing said heating chamber into left and right sides;
   a plurality of electric heating elements in each of said right and left side of said heating chamber;
   left and right sets of motorized movable heat shields disposed below said electric heating elements and configured as longitudinally rotatable parallel overlapping slats;
   linkages coupling each of said left and right sets of movable heat shields to an electric heat shield motor;
   left and right air blower manifolds disposed, respectively, in said left and right heating chambers, said left and right air blower manifold assemblies each having an air plenum, each with an air inlet in fluid communication with a motorized air blower and an array of air outlet holes disposed above each of said electric heating elements, wherein air in said plenum exits said air hole arrays under low pressure and is driven downwardly, alongside said heating elements and heat reflectors, to shape and direct the heat pattern over and onto food product on said movable cooking shelf; and
   a programmable controller having a user interface and programmed to control said electric heating elements, said air blower motor, and said heat shield motors.

2. The rapid cook broiler of claim 1, wherein said programmable controller is configured to enable user inputs through said user interface to call preset programs to operate said according to time inputs by the user.

3. The rapid cook broiler of claim 2, wherein when in operation, said controller is configured such that when initially turned on, said electrical heating elements produce heat but said heat shields remain closed to prevent most of the heat from passing through to said cooking chamber until an initial user input is given to the control system by the operator through the user interface.

4. The rapid cook broiler of claim 3, wherein the initial user input provides an option to specify which of said left and right sides of said cooking chamber will be employed and how much time will be required for the product finishing.

5. The rapid cook broiler of claim 4, wherein said controller is configured such that a start button pushed after an initial user input signifies that food product is in said cooking chamber, whereafter said controller open said heat shields to expose said electric heating elements so that directed heat may pass from said heating chambers to one or more of said cooking chambers, and wherein when said heat shields are fully open, said air blower pushes heated air from said air plenum into said cooking chamber.

6. The rapid cook broiler of claim 5, wherein said controller is configured to turn off said air blower and close said heat shields after the selected time indicated in the initial user input has passed.

7. The rapid cook broiler of claim 1, wherein said wherein said electric heating elements in each of said right and left sides of said heating chamber are disposed in parallel arrays.

8. The rapid cook broiler of claim 7, wherein said parallel arrays of said electric heating elements run transversely from either said left wall or said right wall to said partition.

9. The rapid cook broiler of claim 1, further including a link to couple said movable heat shields in each of said left and right cooking chambers for unified longitudinal rotational movement.

10. The rapid cook broiler of claim 9, wherein said link is a push rod structurally and operatively connected to said heat shield motor.

11. The rapid cook broiler of claim 9, wherein said link is a linear actuator.

12. The rapid cook broiler of claim 1, wherein said left and right air blower manifold assemblies include rectangular boxes with a planar top, contiguous sides, a planar lower side, and a plurality of parallel spaced-apart heat reflectors coupled to said lower side.

13. The rapid cook broiler of claim 1, wherein each of said left and right air plenums includes horizontally disposed baffles which divide each of said left and right plenum into upper and lower halves in fluid communication with one another, such that air in each of said lower halves is under pressure.

14. The rapid cook broiler of claim 1, wherein said air blower motor and said heat shield motors are each housed in a motor compartment on a backside of said cooking chamber.

15. The rapid cook broiler of claim 1, wherein said controller and a power supply for said controller are housed in an enclosure having air vents on an outer side of one of said left or right wall of said interior chamber.

16. The rapid cook broiler of claim 1, wherein said controller is an ASIC or a microcontroller.

* * * * *